US012370802B2

(12) United States Patent
Ichikawa et al.

(10) Patent No.: US 12,370,802 B2
(45) Date of Patent: Jul. 29, 2025

(54) LIQUID DISCHARGING APPARATUS

(71) Applicant: BROTHER KOGYO KABUSHIKI KAISHA, Nagoya (JP)

(72) Inventors: Shohei Ichikawa, Niwa (JP); Asami Hashimoto, Okazaki (JP); Fumiya Nakamura, Nagoya (JP); Kazushige Saigusa, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 183 days.

(21) Appl. No.: 18/446,156

(22) Filed: Aug. 8, 2023

(65) Prior Publication Data

US 2024/0051301 A1 Feb. 15, 2024

(30) Foreign Application Priority Data

Aug. 10, 2022 (JP) ................................ 2022-128328

(51) Int. Cl.
*B41J 2/17* (2006.01)
*B41J 2/165* (2006.01)
*B41J 2/185* (2006.01)

(52) U.S. Cl.
CPC ......... *B41J 2/1721* (2013.01); *B41J 2/16508* (2013.01); *B41J 2/16523* (2013.01); *B41J 2/1728* (2024.05); *B41J 2002/1856* (2013.01)

(58) Field of Classification Search
CPC .. B41J 2/1721; B41J 2/16508; B41J 2/16523; B41J 2/1728; B41J 2002/1856
See application file for complete search history.

(56) References Cited

FOREIGN PATENT DOCUMENTS

JP 2007185902 A * 7/2007 ................ B41J 2/18
JP 2016-175275 A 10/2016

* cited by examiner

*Primary Examiner* — Geoffrey S Mruk
(74) *Attorney, Agent, or Firm* — KENEALY VAIDYA LLP

(57) ABSTRACT

There is provided a liquid discharging apparatus including: a main body casing; a head; a maintenance unit including a cap, a suction pump and a waste liquid tube in which a liquid sucked by the suction pump is to flow; and a waste liquid reservoir which has a joint to which the waste liquid tube is connected or to be connected, and which is configured to store the liquid. The maintenance unit is configured to be inserted into and drawn from the main body casing. The waste liquid tube has a length to connect the waste liquid reservoir and the maintenance unit in a state that the maintenance unit has been moved from an installed-position at which the maintenance unit is installed in an inside of the main body casing to a drawn-out-position at which the maintenance unit is drawn out to an outside of the main body casing.

13 Claims, 7 Drawing Sheets

LIQUID DISCHARGING APPARATUS

REFERENCE TO RELATED APPLICATIONS

This application claims priority from Japanese Patent Application No. 2022-128328 filed on Aug. 10, 2022. The entire content of the priority application is incorporated herein by reference.

BACKGROUND ART

There is a known configuration that a cap member configured to seal a line head having nozzles from which a liquid is ejected or discharged and a depressurizing pump configured to suck the liquid from the nozzles of the line head are installable and detachable with respect to the liquid jetting apparatus.

DESCRIPTION

In the recent years, there is a demand for a downsizing and a prolonged service life of an apparatus in a variety of kinds of fields. In the liquid jetting apparatus as described in Japanese Patent Application Laid-open No. 2016-175275, however, the cap member or the depressurizing pump cannot be installed or detached with respect to the liquid jetting apparatus, unless a first tube through which the liquid flows has been detached from the cap member, or a second tube through which the liquid flows has been detached from the depressurizing pump. In a case that the liquid jetting apparatus is downsized, it is difficult to secure, in the inside of the liquid jetting apparatus, a sufficient space for detaching the first tube or the second tube. Accordingly, it becomes difficult to replace the cap member or the depressurizing pump.

The present disclosure has been made in view of the above-described problem and an object of the present disclosure is to provide a liquid discharging apparatus in which a maintenance unit or a cap can be easily replaced.

According to an aspect of the present disclosure, there is provided a liquid discharging apparatus including:

a main body casing;

a head having a nozzle configured to discharge a liquid;

a maintenance unit including a cap configured to seal the nozzle by covering a nozzle surface of the head, a suction pump configured to suck the liquid in the nozzle and a waste liquid tube in which the liquid sucked by the suction pump is to flow; and a waste liquid reservoir which has a joint to which the waste liquid tube is connected or to be connected, and which is configured to store the liquid sent from the maintenance unit. The maintenance unit is configured to be inserted into and drawn from the main body casing. The waste liquid tube has a length to connect the waste liquid reservoir and the maintenance unit in a state that the maintenance unit has been moved from an installed-position at which the maintenance unit is installed in an inside of the main body casing to a drawn-out-position at which the maintenance unit is drawn out to an outside of the main body casing.

According to the above-described configuration, the maintenance unit can be drawn out to the outside of the main body casing while maintaining a connection between the maintenance unit and the waste liquid reservoir by the waste liquid tube. Accordingly, a space obtained by detaching the maintenance unit or a space at the outside of the main body casing can be utilized to release the connection of the waste liquid tube. This allows a user to easily replace the maintenance unit.

In the liquid discharging apparatus of the present disclosure, the maintenance unit may include a unit casing in which the cap and the suction pump are housed; and a length of a portion of the waste liquid tube drawn out to an outside of the unit casing may be longer than a length from the joint to an outer wall surface of the main body casing in an inserting-drawing direction of the maintenance unit along which the maintenance unit is inserted into and drawn from the main body casing.

According to the above-described configuration, the maintenance unit can be moved up to the drawn-out-position. This allows the user to easily replace the maintenance unit.

In the liquid discharging apparatus of the present disclosure, the waste liquid tube may have a free-moving-portion configured to move, at the outside of the unit casing, in a direction which is a radial direction of the waste liquid tube and which is a direction separating from the unit casing; and a length of the free-moving-portion may be longer than the length from the joint to the outer wall surface of the main body casing in the inserting-drawing direction of the maintenance unit.

According to the above-described configuration, since the waste liquid tube has the free-moving-portion, there is no limitation or restriction to the movement of the waste liquid tube with respect to the unit casing, at the outside of the unit casing. This makes it possible to draw the maintenance unit to the outside of the main body casing, while maintaining the connection between the maintenance unit and the waste liquid reservoir by the waste liquid tube.

In the liquid discharging apparatus of the present disclosure, the unit casing may have a fixer configured to fix the portion of the waste liquid tube drawn out to the outside of the unit casing so that the portion of the waste liquid tube drawn out to the outside of the unit casing is not separated from the unit casing; and the free-moving-portion may be an area from a part, of the waste liquid tube, fixed to the unit casing by the fixer and an end, of the waste liquid tube, on a side of the joint.

According to the above-described configuration, a part of the waste liquid tube drawn out to the outside of the unit casing is fixed with respect to the unit casing. This makes it possible to limit or restrict the area of the free-moving-portion of the waste liquid tube. This makes it possible to reduce any bending or deflection of the waste liquid tube at the installed position.

In the liquid discharging apparatus of the present disclosure, the fixer may be positioned, in the inserting-drawing direction and in a state that the maintenance unit is positioned at the installed position, at a position different from a position of the joint.

According to the above-described configuration, in a case that the maintenance unit is positioned at the installed-position, it is possible to provide a state that the waste liquid tube is pulled (tight) in the inserting-drawing direction. This makes it possible to reduce occurrence of interference of the bent waste liquid tube with another member.

In the liquid discharging apparatus of the present disclosure, the joint may be positioned, in the inserting-drawing direction and in the state that the maintenance unit is positioned at the installed position, between the outer wall surface of the main body casing and the fixer.

According to the above-described configuration, it is possible to make the length in the inserting-drawing direction from the joint to the outer wall surface of the main body casing to be short. This makes it possible to make the length of the portion of the waste liquid tube which is drawn out to the outside of the unit casing to be short.

In the liquid discharging apparatus of the present disclosure, the joint may be positioned, in an inserting-drawing direction of the maintenance unit, between an outer wall surface of the main body casing and at least a part of the waste liquid reservoir.

According to the above-described configuration, in a case that the connection between the joint and the waste liquid tube is released, the joint is positioned on the side of the outer wall surface of the main body casing to which a hand of the user easily reaches. This allows the user to easily replace the maintenance unit.

In the liquid discharging apparatus of the present disclosure, the waste liquid tube may be drawn out from a surface, of the unit casing, facing a direction in which the maintenance unit is inserted into the main body casing, along the inserting-drawing direction.

According to the above-described configuration, in a case that the maintenance unit is positioned at the installed-position, the waste liquid tube can be stored in an empty or free space in the inside of the main body casing. This makes it possible to reduce occurrence of the interference of the waste liquid tube with another member.

In the liquid discharging apparatus of the present disclosure, the joint may be provided on a surface, of the waste liquid reservoir, facing the unit casing of the maintenance unit positioned at the installed-position.

According to the above-described configuration, it is possible to release the connection of the waste liquid tube at the joint, inside a space obtained after detaching of the maintenance unit from the main body casing. This allows the user to easily replace the maintenance unit.

In the liquid discharging apparatus of the present disclosure, the waste liquid reservoir may include a first waste liquid reservoir fixed to the main body casing, and a second waste liquid reservoir which is configured to store a waste liquid from the first waste liquid reservoir and which is configured to be inserted into and drawn from the main body casing; and the first waste liquid reservoir may have the joint.

According to the above-described configuration, the waste liquid from the maintenance unit is stored in the second waste liquid reservoir, via the first waste liquid reservoir fixed to the main body casing. Accordingly, in a case of drawing and detaching the second waste liquid reservoir from the main body casing, there is no need to detach the waste liquid tube from the maintenance unit. This allows the user to easily replace the second waste liquid reservoir.

In the liquid discharging apparatus of the present disclosure, the unit casing may have a holder configured to hold the free-moving-portion of the waste liquid tube in a case that the maintenance unit is positioned at the installed position.

According to the above-described configuration, in a case that the maintenance unit is positioned at the installed-position, the bent waste liquid tube can be held at the holder. Accordingly, the bent waste liquid tube which is not bent sharply (broken), etc. This makes it possible to reduce any stagnation of a flow of the liquid flowing in the waste liquid tube.

According to another aspect of the present disclosure, there is provided a liquid discharging apparatus including:

a main body casing;

a head having a nozzle configured to discharge a liquid;

a maintenance unit including a cap configured to seal the nozzle by covering a nozzle surface of the head, a suction pump configured to suck the liquid in the nozzle and a waste liquid tube which is connected or to be connected to a first joint of the cap and in which the liquid sucked by the suction pump is to flow; and a waste liquid reservoir to which the waste liquid tube is connected and which is configured to store the liquid sent from the maintenance unit. The cap of the maintenance unit is configured to be inserted into and drawn from the main body casing. The waste liquid tube has a length to connect the waste liquid reservoir and the cap in a state that the cap has been moved from an installed-position at which the cap is installed in an inside of the main body casing to a drawn-out-position at which the cap is drawn out to an outside of the main body casing.

According to the above-described configuration, the cap can be drawn out to the outside of the main body casing while maintaining the connection between the cap and the suction pump by the waste liquid tube. Accordingly, the connection of the waste liquid tube can be released at the outside of the main body casing. This allows the user to easily replace the cap.

In the liquid discharging apparatus of the present disclosure, the nozzle may include a first nozzle and a second nozzle; the cap may include a first cap configured to cover a first part of the nozzle surface of the head in which the first nozzle is formed, and a second cap configured to cover a second part of the nozzle surface of the head in which the second nozzle is formed; the maintenance unit may further include a switch configure to perform switching, with respect to the first nozzle and the second nozzle, between a suction state in which the liquid is sucked by the suction pump and a non-suction state in which the liquid is not sucked by the suction pump; the waste liquid tube may include a first waste liquid tube having a first end connected or to be connected to the first joint and a second end connected or to be connected to a second joint of the switch, and a second waste liquid tube having a first end connected to the switch and a second end connected to a side of the waste liquid reservoir via the suction pump; and a length of the first waste liquid tube may be longer than a length from the second joint of the switch to an outer wall surface of the main body casing in an inserting-drawing direction of the cap along which the cap of the maintenance unit is inserted into and drawn from the main body casing.

According to the above-described configuration, the cap can be moved up to the drawn-out-position. This allows the user to easily replace the cap.

According to an aspect of the present disclosure, it is possible to provide a liquid discharging apparatus capable of easily replacing the maintenance unit or the cap.

FIRST EMBODIMENT

In the following, an embodiment of the present disclosure will be described in detail.

<Schematic Configuration of Ink-Jet Printer>

Figure 1:
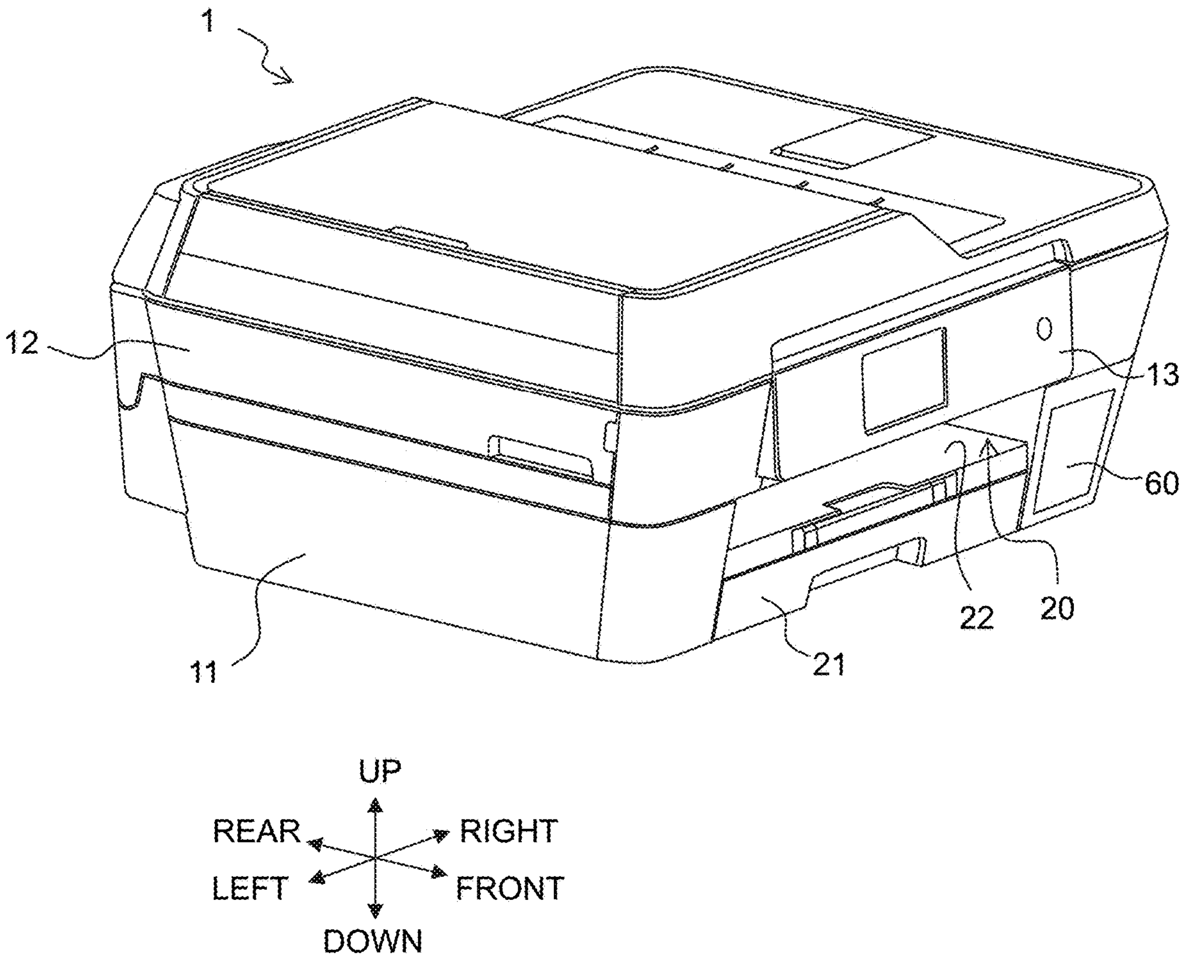
FIG. 1 is a perspective view depicting the outer appearance of an ink-jet printer.

With reference to FIG. 1, the schematic configuration of an ink-jet printer 1 will be explained. FIG. 1 is a perspective view depicting the outer appearance of the ink-jet printer 1. The ink-jet printer 1 depicted in FIG. 1 is an example of a liquid discharging apparatus. In the following explanation, an up-down direction is defined, using a state as depicted in FIG. 1, etc., in which the ink-jet printer 1 is installed usably, as the reference state, and such that a side of a surface on which the ink-jet printer 1 is installed is defined as down-side; a front-rear direction is defined such that a side on which an opening 20 is provided is defined as a front side; and a left-right direction is defined, such that left side seeing the ink-jet printer 1 from the front side is left. Note that the left-right direction is also referred to as a "scanning direction", in some cases, which is a moving direction of a carriage 40 (to be described later on; see FIG. 2).

As depicted in FIG. 1, the ink-jet printer 1 forms, as a whole, a substantially rectangular parallelepiped shape with a main body casing 11 and a scanner casing 12 stacked at an upper part of the ink-jet printer 1.

An operation panel 13 and a cartridge cover 60 are provided on a front surface of the main body casing 11. The operation panel 13 has a variety of kinds of operation buttons and a liquid crystal displaying part. Further, the opening 20 is formed in the front surface of the main body casing 11; a feed tray 21 and a discharge tray 22 are provided, such that the feed tray 21 and the discharge tray 22 are detachable with respect to the ink-jet printer 1 via the opening 20 formed in the front surface of the main body casing 11. The scanner casing 12 has a scanner configured to read an image recorded on a sheet P.

Figure 3:
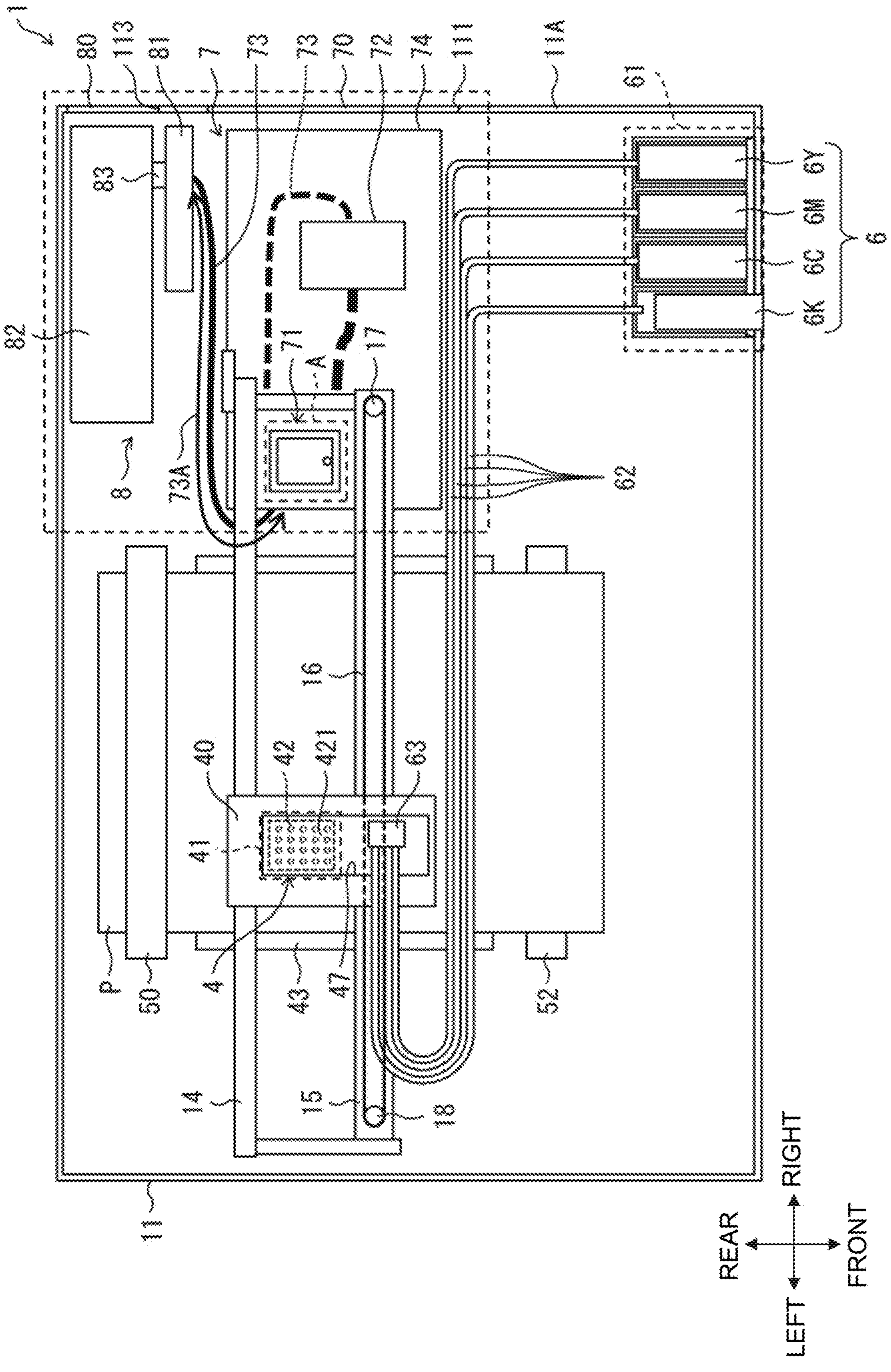
FIG. 3 is a plane view seeing the internal configuration of the ink-jet printer from above.

The cartridge cover 60 is provided on the right side in the front surface of the main body casing 11. The cartridge cover 60 is provided to be rotatable with respect to the main body casing 11. As depicted in FIG. 3, ink cartridges 6 installed in a cartridge case 61 are arranged in the space behind the cartridge cover 60. Four ink cartridges 6Y, 6M, 6C and 6K store, respectively, a yellow ink (Y), a magenta ink (M), a cyan ink (C) and a black ink (K) therein. Note that the number of the ink cartridge 6 installed in the cartridge case 61 is not limited to be plural; a configuration wherein one ink cartridge 6 is installed in the cartridge case 61 is also adoptable.

<Internal Configuration of Ink-Jet Printer>

Figure 2:
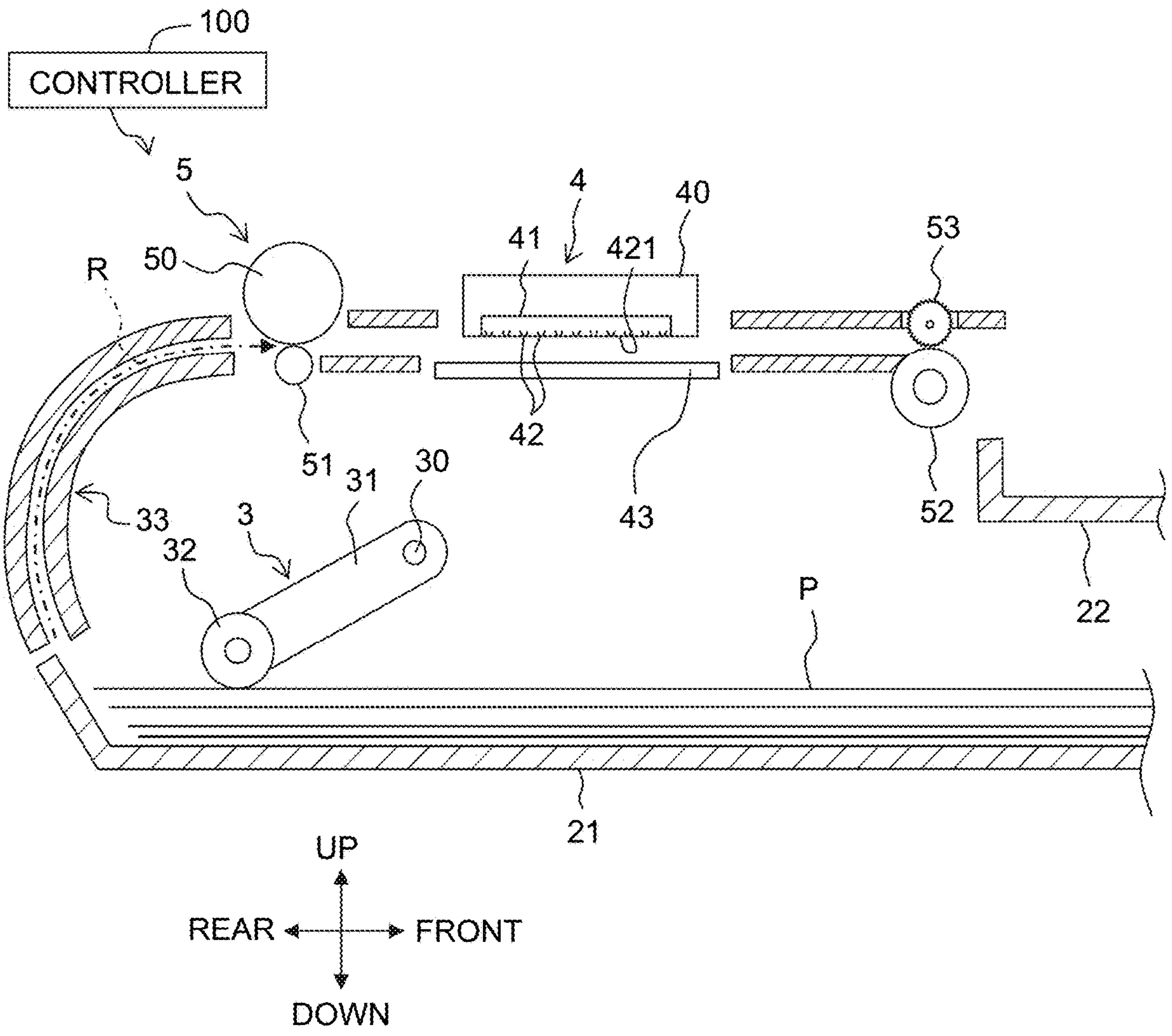
FIG. 2 is a cross-sectional view schematically depicting the internal configuration of the ink-jet printer.

Next, an explanation will be given about the internal configuration of the ink-jet printer 1, with reference to FIGS. 2 and 3. FIG. 2 is a cross-sectional view schematically depicting the internal configuration of the ink-jet printer 1. FIG. 3 is a plane view seeing the internal configuration of the ink-jet printer 1 from the above.

As depicted in FIGS. 2 and 3, the ink-jet printer 1 is provided with a feeding part 3, a recording part 4, a conveying mechanism 5, a maintenance unit 7, a waste liquid tank 8 and a controller 100.

As depicted in FIG. 2, the feeding part 3 has a shaft 30, a feeding arm 31 and a feeding roller 32. The feeding part 3 feeds, to a conveying route R, a sheet P accommodated in the feed tray 21 by a normal rotation of the feeding roller 32. The feeding roller 32 is rotatably supported by a forward end part of the feeding arm 31. The feeding arm 31 is pivotably supported by the shaft 30 which is supported by a frame of the ink-jet printer 1. The feeding arm 31 is pivotably urged toward the feed tray 21 by the self-weight or an elastic force by a spring, etc.

The conveying route R extends upward from a rear end part of the feed tray 21. The conveying route R is a route which is curved in an area thereof defined by a guide member 33, and which reaches the discharge tray 22 via the position where the printing part 4 is arranged.

In a case that a feeding motor (not depicted in the drawings) is driven by the controller 100, the feeding roller 32 takes out, one by one, sheets P from the feed tray 21. Each of the sheets P taken out from the feed tray 21 is fed along the conveying route R, and is supplied to the recording part 4.

The recording part 4 is arranged at a position above the feeding part 3. The recording part 4 is provided with a carriage 40, a recording head 41, a plurality of nozzles 42, a platen 43 and a buffer tank 47. As depicted in FIG. 3, the carriage 40 is attached to two guide rails 14 and 15 which are positioned above the platen 43. The carriage 40 is configured to be movable in the left-right direction along the two guide rails 14 and 15 in an area facing the platen 43. In a case that a driving force of a carriage motor (not depicted in the drawings) is transmitted to the carriage 40, the carriage 40 is reciprocally moved in the scanning direction, namely, a width direction of the sheet P which is conveyed.

The recording head 41 is mounted on the carriage 40. The recording head 41 is an example of a "liquid discharging part (liquid discharger)" or a "head". As depicted in FIG. 2, the plurality of nozzles 42 is provided on a lower surface (hereinafter referred to as a "nozzle surface 421", in some cases) of the recording head 41. The plurality of nozzles 42 are aligned in the front-rear direction to thereby form a nozzle row (nozzle array). As depicted in FIG. 3, the nozzle surface 421 has four nozzle rows which are formed therein and which are arranged side by side in the left-right direction. The plurality of nozzles 42 communicate with inside of the buffer tank 47. The black, yellow, cyan, and magenta inks are discharged from the plurality of nozzles 42, in this order starting from a nozzle row which is included in the four nozzle rows and which is located on the right (rightmost) side in the left-right direction. Note that the order of arranging the nozzle rows is not limited to this; it is acceptable to change the order of arrangement product by product (model by model). The recording head 41 causes vibrating elements such as piezoelectric elements to vibrate to thereby discharge or eject, from the plurality of nozzles 42, the ink(s) stored in the buffer tank 47.

As depicted in FIG. 3, the inks from the ink cartridges 6 are supplied to the buffer tank 47 via four supply tubes 62. Further, a tube joint 63 is provided integrally on the buffer tank 47. One end of each of the four supply tubes 62 is detachably connected to the tube joint 63. The other end of each of the four supply tubes 62 is connected to one of the four ink cartridges 6Y, 6M, 6C and 6K.

As depicted in FIG. 2, the platen 43 is arranged at a position which is below the recording head 41 and which faces the plurality of nozzles 42. The platen 43 extends over an entire length in the left-right direction of the sheet P. At a time of a recording processing, the platen 43 supports the sheet P from therebelow. The recording head 41 discharges ink droplets selectively onto the sheet P supported by the platen 43 in a process in which the carriage 40 is moved, thereby recording an image on the sheet P.

In a case that the controller 100 of the ink-jet printer 100 performs the recording of an image on the sheet P, the controller 100 repeats a recording processing of discharging the ink from the plurality of nozzles 42 of the recording head 41 while moving the carriage 40 in the width direction of the sheet P in a state that the sheet P is stopped to thereby record an image corresponding to one line on the sheet P, and a conveying processing of driving the conveying roller 50 and the discharging roller 52 to thereby convey the sheet P by a predetermined line feed amount.

The conveying mechanism 5 has a conveying roller 50 and a discharging roller 52 which are arranged, in the front rear direction, such that the carriage 40 and the platen 43 are interposed between the conveying roller 50 and the discharging roller 52. A pinch roller 51 is provided on a location below the conveying roller 50 at a position facing the conveying roller 50. The conveying roller 50 is driven by a conveying motor (not depicted in the drawings). The pinch roller 51 rotates accompanying with rotation of the conveying roller 50. By the conveying roller 50 and the pinch roller 51 rotating normally, the sheet P is thereby nipped by the conveying roller 50 and the pinch roller 51 and is conveyed along the conveying route toward the recording part 4.

The discharging roller 52 is provided to be positioned on the downstream side with respect to the conveying roller 50, with the carriage 40 and the platen 43 being interposed between the discharging roller 52 and the conveying roller 50 in the front-rear direction. A spur roller 53 is provided at a position above the discharging roller 52 and at a position facing the discharging roller 52. The discharging roller 52 is driven by the conveying motor (not depicted in the drawings). The spur roller 53 rotates accompanying with rotation of the discharging roller 52. By the discharging roller 52 and the spur roller 53 rotating normally, the sheet P is thereby nipped by the discharging roller 52 and the spur roller 53 and is discharged to the discharge tray 22.

The controller 100 include a CPU (Central Processing Unit), a ROM (Read Only Memory), a RAM (Random Access Memory) and an ASIC (Application Specific Integrated Circuit) including various kinds of control circuits, etc. The controller 100 is connected to a various kinds of devices or units constructing the ink-jet printer 1, such as the recording head 41, the conveying motor of the conveying mechanism 5, etc. Further, the controller 100 is also connected to the operation panel 13 and a PC, etc., which is an external apparatus.

The controller 100 executes a variety of kinds of processings such as a printing processing, etc., in accordance with a program stored in the ROM, by controlling operations of the recording head 41, the maintenance unit 7, etc., with the CPU and the ASIC. The controller 100 executes the printing processing of printing an image on the sheet P based on a print instruction transmitted from the external apparatus such as the PC, etc., by controlling the recording head 41, the conveying motor, etc. The maintenance unit 7 and a flushing operation will be described later on. Note that in the present embodiment, although the explanation will be given on the premise that the controller 100 is provided with the CPU, the ROM, the RAM and the ASIC, the present disclosure is not limited to or restricted by such a configuration. The controller 100 may be realized by any hardware configuration.

In the above-described configuration, the ink-jet printer 1 prints an image on the sheet P by discharging the ink while moving the recording head 41 together with the carriage 40 in the scanning direction, as well as conveying the sheet P in the conveying direction by the conveying mechanism 5.

<Configuration of Maintenance Unit>

Figure 4:
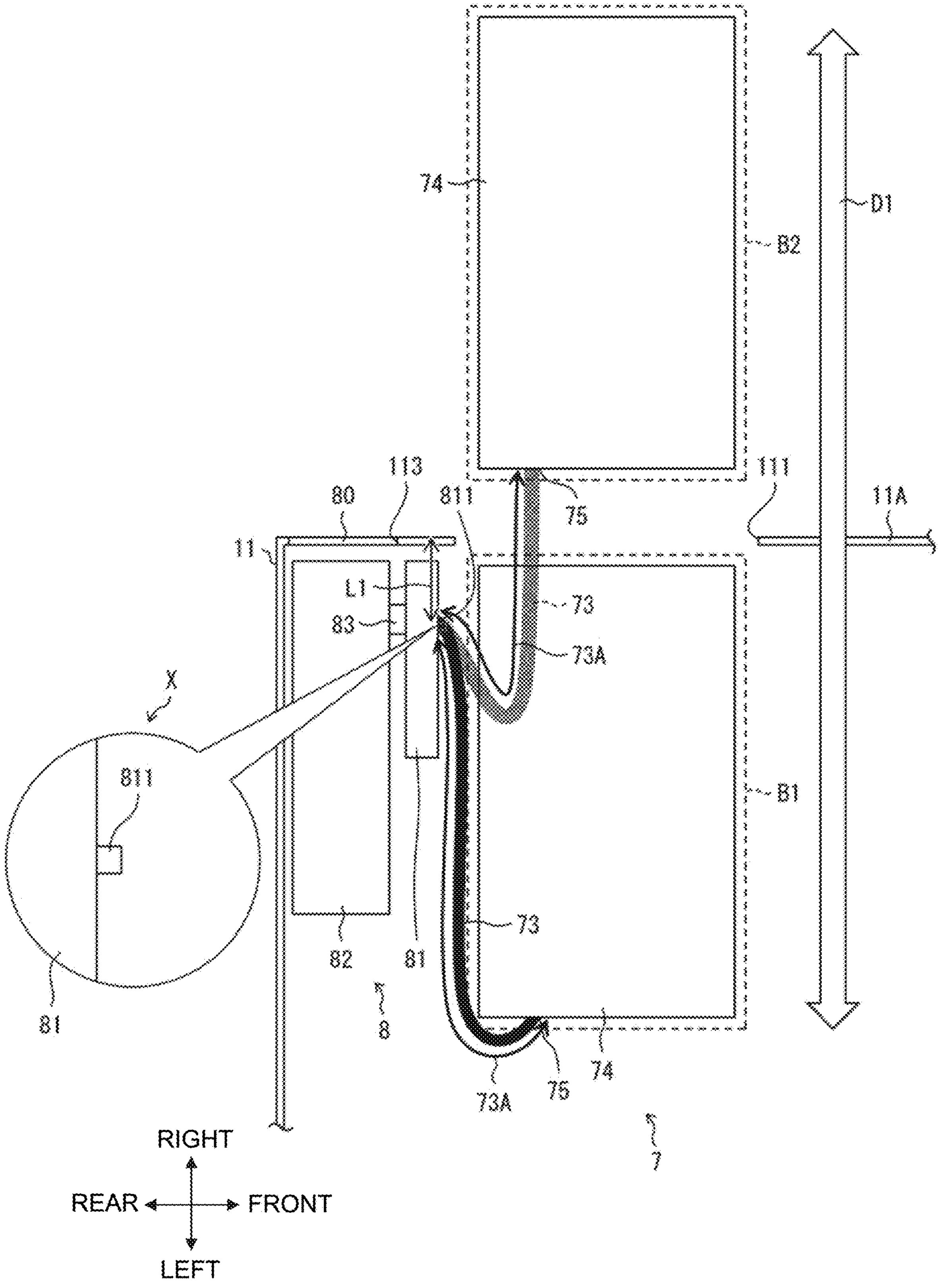
FIG. 4 is a schematic enlarged view of a part enclosed by broken lines in FIG. 3, indicating a state that a maintenance unit is positioned at an installed position and a state that the maintenance unit is positioned at a drawn-out-position.
Figure 5A:
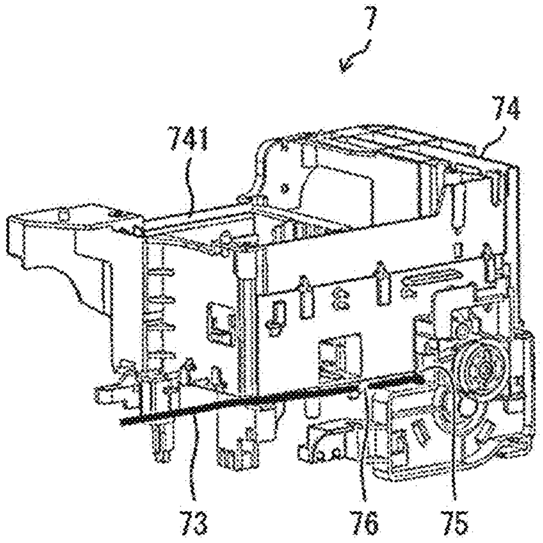
FIGS. 5A and 5B are perspective views each depicting the configuration of the maintenance unit.
Figure 5B:
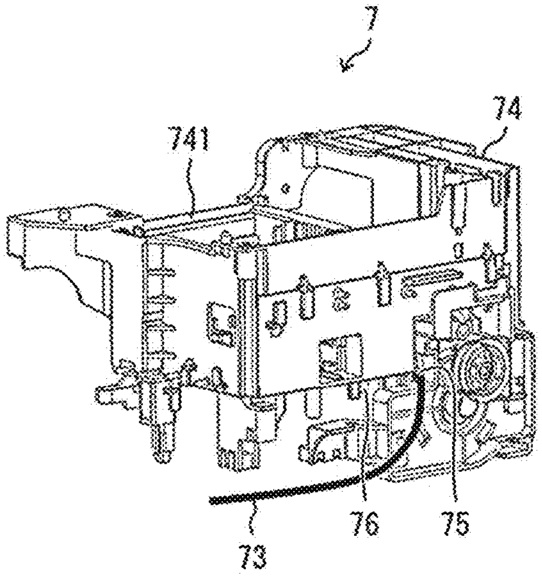

The configuration of the maintenance unit 7 will be explained, by using FIGS. 3 to 5. FIG. 4 is a schematic enlarged view of a part enclosed by broken lines in FIG. 3, indicating a state that a maintenance unit 7 is positioned at an installed-position B1 and a state that the maintenance unit is positioned at a drawn-out-position B2. FIGS. 5A and 5B are perspective views each depicting the configuration of the maintenance unit. Note that in FIG. 4, only the maintenance unit 7 and the waste liquid tank 8 are depicted, in consideration of easy viewing of the drawing. Further, in FIG. 4, the internal configuration of the maintenance unit 7 is omitted in the illustration, and a state that a cover member 70 is detached from the main body casing 11 is depicted.

The maintenance unit 7 performs maintenance for restoring or recovering a discharge state of the plurality of nozzles 42 of the recording head 41. An operation of the maintenance unit 7 is controlled by the controller 100. As depicted in FIG. 3, the maintenance unit 7 is arranged on the right side in the ink-jet printer 1. The maintenance unit 7 is arranged on the rear side with respect to the cartridge case 61.

The maintenance unit 7 is provided to be insertable and drawable with respect to the main body casing 11. In the present embodiment, the maintenance unit 7 is inserted and drawn via a side wall 11A on the right side in the left-right direction of the main body casing 11. The side wall 11A is formed with an opening 111 via which the maintenance unit 7 is drawn and detached to the outside of the main body casing 11. The opening 111 is made to be openable and closable by the cover member 70 which is detachable with respect to the main body casing 11. In the present embodiment, an inserting-drawing direction D1 of the maintenance unit 7 is the left-right direction with respect to the main body casing 11. Note that the cover member 70 may be configured to be a lid part which is rotatable with respect to the main body casing 11.

The maintenance unit 7 is provided with a cap 71, a suction pump 72, a waste liquid tube 73 and a unit casing 74. The cap 71 is arranged in the inside of the unit casing 74. The cap 71 is driven upward by a lifting-lowering mechanism. In a case that the cap 71 is moved upward, the cap 71 passes through an opening 741 (see FIGS. 5A and 5B) formed at an upper part of the unit casing 74, and covers the nozzle surface 421 of the recording head 41 which stands by at a standby position A. The standby position A of the recording head 41 is a position at which the carriage 40 stands by at a predetermined position in a case that any image is not recorded on the sheet P. The cap 71 covers the nozzle surface 421 to thereby seal the plurality of nozzles 42.

The suction pump 72 is arranged in the inside of the unit casing 74. The suction pump 72 sucks the ink (waste liquid) in the inside of the plurality of nozzles 42 sealed by the cap 71. The suction pump 72 is a tube pump. The suction pump 72 has a disc-shaped member around which the waste liquid tube is wound. The disc-shaped member of the suction pump 72 is driven by a driving motor (not depicted in the drawings). In a case that the disc-shaped member is driven, the inks inside the plurality of nozzles 42 are sucked.

The waste liquid tube 73 is a tube through which a liquid sucked by the suction pump 72 flows. One end of the waste liquid tube 73 is connected to the cap 71, and the other end of the waste liquid tube 73 is connected to the waste liquid tank 8. Note that the waste liquid tube 73 may have such a configuration that the waste liquid tube 73 extends via a switching mechanism at a position between the cap 71 and the suction pump 72, the switching mechanism performing switching between the suction state wherein the ink is sucked by the suction pump 72 and a non-suction state wherein the ink is not sucked by the suction pump 72. Alternatively, the waste liquid tube 73 may have such a configuration that the waste liquid tube 73 extends via a joint at a position between the suction pump 72 and the end, of the waste liquid tube 73, which is connected to a projected part 811.

A portion of the waste liquid tube 73 is drawn from the inside of the unit casing 74 to the outside of the unit casing 74, via an opening (not depicted in the drawings) formed in the unit casing 74. In FIG. 3, the portion of the waste liquid tube 73 drawn to the outside of the unit casing 74 is depicted by a solid line, and a portion of the waste liquid tube 73 positioned in the inside of the unit casing 74 is depicted by a broken line. The waste liquid tube 73 is drawn to the outside of the unit casing 74 from a surface, of the unit casing 74, which is oriented (faces) an inserting direction in which the maintenance unit 7 is inserted into the main body casing 11 along the inserting and drawing direction D1.

According to the above-described configuration, in a case that the maintenance unit 7 is positioned at the installed position, it is possible to accommodate the waste liquid tube 73 in an empty or free space inside the main body casing 11. With this, it is possible to reduce interfering of the waste liquid tube 73 with another member.

Note that the surface, of the unit casing 74, from which the waste liquid tube 73 is drawn out is not limited to this. The waste liquid tube 73 may be drawn to the outside of the unit casing 74, from (i) a right side surface, of the unit casing 74, which faces the direction in which the maintenance unit 7 is drawn out in the inserting-drawing direction D1, (ii) a rear surface, of the unit casing 74, facing a first waste liquid tank 81, (iii) a front surface, of the unit casing 74, which is opposite to a surface, of the unit casing 74, which faces the first waste liquid tank 81 in a direction orthogonal to the inserting-drawing direction D1, or (iv) an upper surface, of the unit casing 74, which faces the side of the standby position A of the recording head 41.

The unit casing 74 has a fixing part (fixer) 75 configured to fix the waste liquid tube 73 drawn to the outside of the unit casing 74 so that the waste liquid tube 73 is not separated from the unit casing 74. In the present embodiment, the fixing part 75 is provided at an opening, of the unit casing 74, from which the waste liquid tube 73 is drawn out. In a part, of the unit casing 74, in which the opening is formed, the waste liquid tube 73 is in a state of being not separated from the unit casing 74, and is in a state that a posture of the waste liquid tube 73 is fixed so that the waste liquid tube 73 is not bent or folded, etc.

As depicted in FIG. 4, in a state that the maintenance unit 7 is moved from the installed-position B1 at which the maintenance unit 7 is installed in the inside of the main body casing 11 to the drawn-out-position B2 at which the maintenance unit 7 is drawn out to the outside of the main body casing 11, a length of the waste liquid tube 73 is a length capable of connecting the first waste liquid tank 81 and the maintenance unit 7. More specifically, the length of a portion of the waste liquid tube 73 which is drawn to the outside of the unit casing 74 is longer than a length L1 in the inserting-drawing direction D1 from the projected part 811 up to an outer wall surface of the side wall 11A of the main body casing 11. In other words, in a case that the length of the waste liquid tube 73 (that is the length of the portion of the waste liquid tube 73 which is drawn to the outside of the unit casing 74) is longer than the length L1, it is possible to move the maintenance unit 7 from the installed-position B1 to the drawn-out-position B2. Note that in FIG. 4, the waste liquid tube 73 in the case that the maintenance unit 7 is positioned at the installed-position B1 is indicated by a solid line of which color is deep, whereas the waste liquid tube 73 in the case that the maintenance unit 7 is positioned at the drawn-out-position B2 is indicated by a solid line of which color is light.

The waste liquid tube 73 has a free-moving-portion 73A capable of moving, at the outside of the unit casing 74, in a direction which is a radial direction of the waste liquid tube 73 and which is a direction separating from the unit casing 74. Namely, the free-moving-portion 73A is a part, of the waste liquid tube 73, which is capable of freely moving in a direction separating from the unit casing 74 or in a direction approaching closer to the unit casing 74 in a case that the maintenance unit 74 is inserted or drawn. In a case that the maintenance unit 7 is moved from the installed-position B1 to the drawn-out-position B2 as depicted in FIG. 4, the free-moving-portion 73A of the waste liquid tube 73 moves in the direction separating from the unit casing 74.

A length of the free-moving-portion 73A of the waste liquid tube 73 is longer than the length L1. By allowing the waste liquid tube 73 to have the free-moving-portion 73A, the movement of the waste liquid tube 73 with respect to the unit casing 74 is not restricted or regulated at the outside of the unit casing 74. With this, it is possible to draw the maintenance unit 7 to the outside of the body casing 11, while maintaining the connection between the maintenance unit 7 and the waste liquid tank 8 by the waste liquid tube 73. In the present embodiment, the free-moving-portion 73A of the waste liquid tube 73 is an area from a part, of the waste liquid tube 73, which is fixed to the unit casing 74 by the fixing part 75 possessed by the unit casing 74, up to a second end part (that is, the end part connected to the waste liquid tank 8) of the waste liquid tube 73.

Note that the fixing part 75 may be provided on an outer wall surface of the unit casing 74 and that the waste liquid tube 73 may be fixed to the outer wall surface, of the unit casing 74, on which the fixing part 75 is provided. Alternatively, the unit casing 74 may not have the fixing part 75. In such a case, the waste liquid tube 73, drawn to the outside of the unit casing 74 constructs the free-moving-portion 73A. Still alternatively, the waste liquid tube 73 may be configured such that the waste liquid tube 73, which is accommodated in the inside of the unit casing 74, is drawn to the outside of the unit casing 74 via the opening of the unit casing 74.

According to the above-described configuration, the portion, of the waste liquid tube 73, drawn to the outside of the unit casing 74 is fixed with respect to the unit casing 74. Accordingly, it is possible to limit the area of the free-moving-portion 73A of the waste liquid tube 73. With this, it is possible to reduce bending (deflection) of the waste liquid tube 73, in the maintenance unit 7 positioned at the installed position.

Next, an explanation will be given about a holding part 76 possessed by the unit casing 74, with reference to FIGS. 5A and 5B. As depicted in FIGS. 5A and 5B, the unit casing 74 has the holding part 76 which is capable of holding the free-moving-portion 73A of the waste liquid part 73, in the maintenance unit 7 positioned at the installed position. The free-moving-portion 73A is held by the holding part 76, thereby allowing a posture of the free-moving-portion 73A of the waste liquid tube 73 to be maintained at a predetermined posture. Namely, the free-moving-portion 73A is maintained at such a posture that the flow of the ink inside the waste liquid tube 73 does not stagnate, or at such a posture that the waste liquid tube 73 which is bent does not interfere with another member. As an example, the holding part 76 has a configuration such as: a claw capable of allowing the waste liquid tube 73 to be hooked thereon, or a groove capable of allowing the waste liquid tube 73 to be fitted thereinto, etc. Note that the holding part 76 has a configuration capable of allowing the user to perform an operation to hold the posture of the waste liquid tube 73 or an operation to release the posture of the waste liquid tube 73, at a time of inserting and drawing the maintenance unit 7.

FIG. 5A depicts a state that the waste liquid tube 73 is held with respect to the unit casing 74, and FIG. 5B depicts a state that the waste liquid tube 73 is not held with respect to the unit casing 74. In the maintenance unit 7 depicted in FIG. 5A, the waste liquid tube 73 is held by the holding part 76. On the other hand, in the maintenance unit 7 depicted in FIG. 5B, the waste liquid tube 73 is not held by the holding part 76. Accordingly, the free-moving-portion 73A of the waste liquid tube 73 is capable of moving in a direction separating with respect to the unit casing 74.

According to the above-described configuration, in a case that the maintenance unit 7 is positioned at the installed-position B1, it is possible to hold the bent waste liquid tube 73 at the holding part 76. With this, the bent waste liquid tube 73 is not bent sharply (broken). With this, it is possible to reduce any stagnation of a flow of the liquid flowing in the waste liquid tube 73.

<Configuration of Waste Liquid Tank>

The configuration of the waste liquid tank 8, which is an example of a "waste liquid reservoir", will be explained with reference to FIGS. 3 and 4. The waste liquid tank 8 is a tank configured to store the ink(s) sucked by the maintenance unit 7. The waste liquid tank 8 has a first waste liquid tank 81 which is an example of a "first waste liquid reservoir", and a second waste liquid tank 82 which is an example of a "second waste liquid reservoir".

The first waste liquid tank 81 is fixed with respect to the main body casing 11. The first waste liquid tank 81 stores the ink fed from the maintenance unit 7. A foam constructed of a non-woven fabric, a sponge, or cotton, etc., capable of absorbing the liquid, may be arranged in the inside of the first waste liquid tank 81.

The first waste liquid tank 81 has the projected part 811 to which the waste liquid tube 73 of the maintenance unit 7 is connected. The projected part 811 is an example of a "joint". A part, of FIG. 4, which is indicated by a reference symbol "X" depicts an enlarged view of the projected part 811 in a state that the waste liquid tube 73 is detached from the projected part 811. The projected part 811 is formed to have a cylindrical shape, and projects toward the outside of the first waste liquid tank 81. The end part of the waste liquid tube 73 is fitted to the projected part 811, thereby allowing the ink(s) from the maintenance unit 7 to be stored in the first waste liquid tank 81. Note that the configuration of connecting the waste liquid tube 73 to the first waste liquid tank 81 is not limited to this. A through hole connecting an internal space of the first waste liquid tank 81 in which the liquid is stored and the outside of the first waste liquid tank 81 may be formed in the first waste liquid tank 81 and that the waste liquid tube 73 may be fitted to the through hole, thereby connecting the waste liquid tube 73 to the first waste liquid tank 81.

The projected part 811 is provided on a surface, of the first waste liquid tank 81, which faces the unit casing 74 of the maintenance unit 7 which is positioned at the installed-position. The projected part 811 is positioned at a position, in the inserting and drawing direction, which is different from the position of the fixing part 75, and is positioned on the side of the outer wall surface of the main body casing 11 with respect to the fixing part 75. That is, the projected part 811 is positioned between the outer wall surface of the side wall 11A of the main body casing 11A and the fixing part 75 in the inserting-drawing direction D1 in a state that the maintenance unit 7 is positioned at the installed-position. The projected part 811 is positioned, in the inserting-drawing direction D1, on the side of the outer wall surface of the side wall 11A of the main body casing 11, with respect to at least a part of the first waste liquid tank 81. That is, the projected part 811 is positioned between the outer wall surface of the side wall 11A of the main body casing 11 and at least a part of the first waste liquid tank 81.

According to the above-described configuration, it is possible to make the waste liquid tube 73 to be in a tighten state in the inserting-drawing direction D1 in a case that the maintenance unit 7 is positioned at the installed-position B1. With this, it is possible to reduce occurrence of interference of the bent waste liquid tube 73 with another member.

According to the above-described configuration, it is possible to make the length L1 in the inserting-drawing direction D1 from the projected part 811 to the outer wall surface of the main body casing 11 to be short. With this, it is possible to make the length of the portion of the waste liquid tube 73, drawn to the outside of the unit casing 74, to be short.

According to the above-described configuration, the projected part 811 is configured such that the connection of the waste liquid tube 73 at the projected part 811 can be released in a space obtained after the maintenance unit 7 has been detached. With this, the user is capable of easily replacing the maintenance unit 7.

Further, according to the above-described configuration, in a case that the connection between the projected part 811 and the waste liquid tube 73 is released, the projected part 811 is located on the side of the outer wall surface, of the main body casing 11, to which a hand of the user easily reaches. With this, the user is capable of easily replacing the maintenance unit 7.

The second waste liquid tank 82 stores the ink fed from the first waste liquid tank 81. A foam constructed of a non-woven fabric, a sponge, or cotton, etc., capable of absorbing the liquid, may be arranged in the inside of the second waste liquid tank 82. The second waste liquid tank 82 connects to the first waste liquid tank 81 by a connecting part 83. The connecting part 83 is a part configured to send the ink(s) from the first waste liquid tank 81 to the second waste liquid tank 82. The connecting part 83 is constructed of: (i) a waste liquid tube connecting the first waste liquid tank 81 and the second waste liquid tank 82 or (ii) a contacting part at which the foam of the first waste liquid tank 81 and the foam of the second waste liquid tank 82 make contact with each other. Note that it is also acceptable to provide such a configuration that the second waste liquid tank 82 has an opening formed therein, the opening being configured to receive an ink droplet flowing or falling from the first waste liquid tank 81. According to such a configuration, there is no need to provide the connecting part 83.

The second waste liquid tank 82 is configured to be inserted into and drawn out from the main body casing 11. A tank replacing part 80 is provided on the side wall 11A of the main body casing 11. The tank replacing part 80 opens and closes an opening 113 which is formed in the side wall 11A of the main body casing 11 and via which the second waste liquid tank 82 is inserted into and drawn from the main body casing 11. The tank replacing part 80 is constructed of a lid part which is rotatable with respect to the main body casing 11, and configured to allow inserting and drawing of the second waste liquid tank 82 with respect to the main body casing 11 by opening the lid part.

Note that the tank replacing part 80 is not limited to the configuration of opening and closing the lid part. For example, it is acceptable to provide a configuration of inserting and drawing the second waste liquid tank 82-unit which is detachable with respect to the main body casing 11, by using the second waste liquid tank 82 and a holding part, of the second waste liquid tank 82, having a lid part. In this configuration, in a case that the second waste liquid tank 82-unit is drawn out from the main body casing 11, the opening 113 corresponding to the shape of the second waste liquid tank 82-unit is exposed in the tank replacing part 80. Further, in a case that the second waste liquid tank 82-unit is inserted with respect to the exposed opening 113, the lid part possessed by the second waste liquid tank 82-unit closes the exposed opening 113.

According to the above-described configuration, the ink from the maintenance unit 7 is stored in the second waste liquid tank 82 via the first waste liquid tank 81 fixed to the main body casing 11. Accordingly, in a case of drawing and detaching the second waste liquid tank 82 from the main body casing 11, there is no need to detach the waste liquid tube 73 from the maintenance unit 7. With this, the user is capable of easily replacing the second waste liquid tank 82.

<Flow of Replacing of Maintenance Unit>

The user draws the maintenance unit 7, which is positioned at the installed-position B1, up to the drawn-out-position B2. In a case that the waste liquid tube 73 is held by the holding part 76, the user releases the holding of the waste liquid tube 73 by the holding part 76 at the installed-position B1 or during a process of drawing out the maintenance unit 7. Afterwards, the user moves the maintenance unit 7 up to the drawn-out-position B2. By positioning the maintenance unit 7 at the drawn-out-position B2, the user is capable of performing an operation by placing his or her hand in a space defined in the installed-position B1. The user places his or her hand in the space defined in the installed-position B1 and releases the fitting between the projected part 811 and the waste liquid tube 73. Then, the user replaces the maintenance unit 7 with a new maintenance unit 7.

Note that in the present embodiment, the explanation has been given about the configuration wherein the connection of the waste liquid tube 73 is released on the side of the first liquid tank 81, at the time of replacing the maintenance unit 7. However, the present disclosure is not limited to this. It is acceptable to provide a configuration wherein the connection of the waste liquid tube 73 is released on the side of the maintenance unit 7. In such a case, a projected part to which the waste liquid tube 73 continuously extending from the first liquid tank 81 is fitted is provide on the unit casing 74 of the maintenance unit 7. The user releases the fitting of the waste liquid tube 73 to the projected part of the maintenance unit 7 positioned at the drawn-out-position B2, thereby performing the replacement of the maintenance unit 7.

According to the above-described embodiment, it is possible to draw out the maintenance unit 7 to the outside of the main body casing 11, while maintaining the connection between the maintenance unit 7 and the waste liquid reservoir by the waste liquid tube 73. Accordingly, the connection of the waste liquid tube 73 can be released utilizing a space defined after detaching of the maintenance unit 7, or a space at the outside of the main body casing 11. This allows the user to easily replace the maintenance unit 7.

Further, since the length of the waste liquid tube 73 which is drawn to the outside of the unit casing 74 is longer than the length L1, it is possible to move the maintenance unit 7 up to the drawn-out-position B2. This allows the user to easily replace the maintenance unit 7.

Second Embodiment

Figure 6:
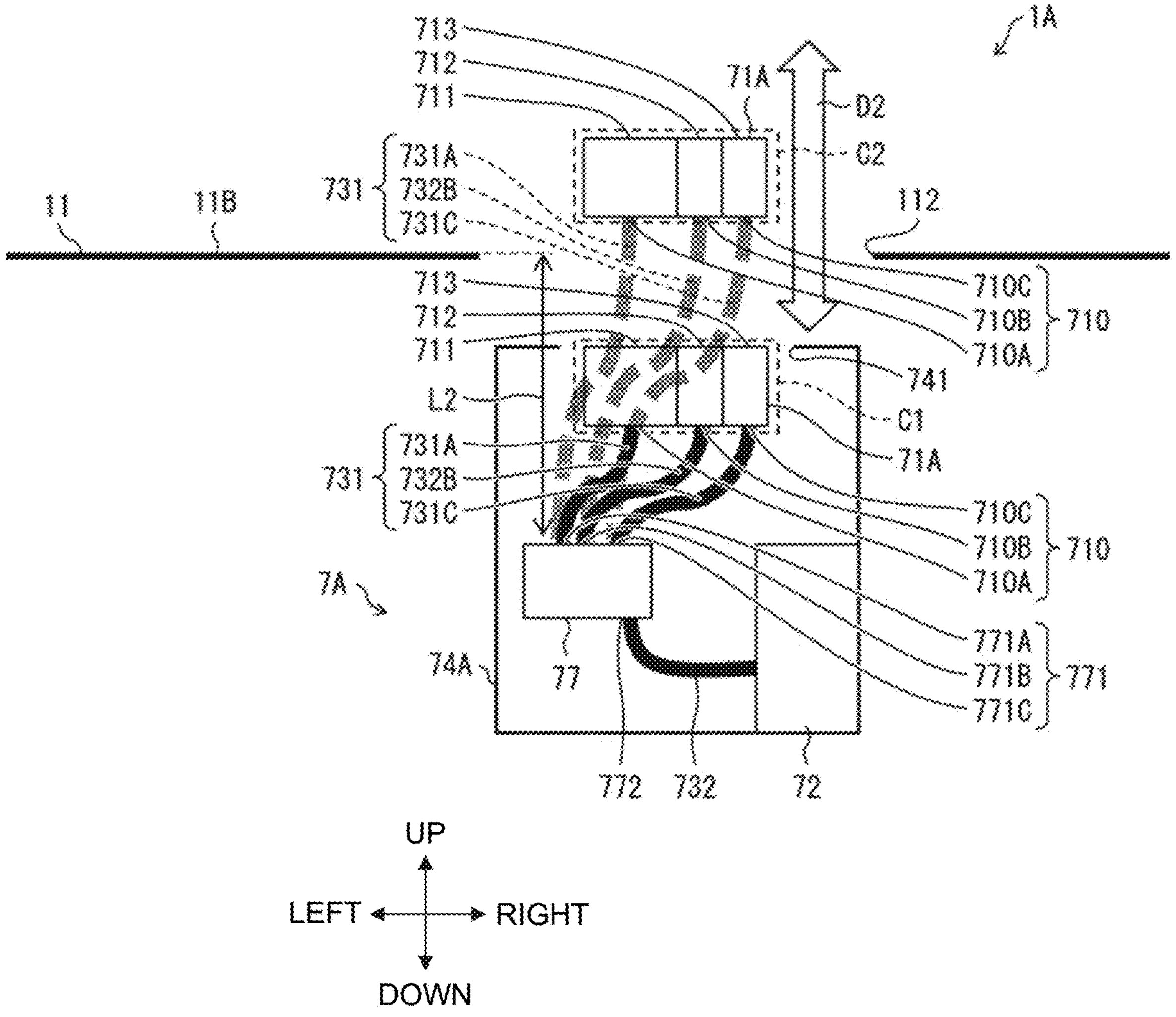
FIG. 6 is a schematic view depicting the configuration of main parts of an ink-jet printer.
Figure 7:
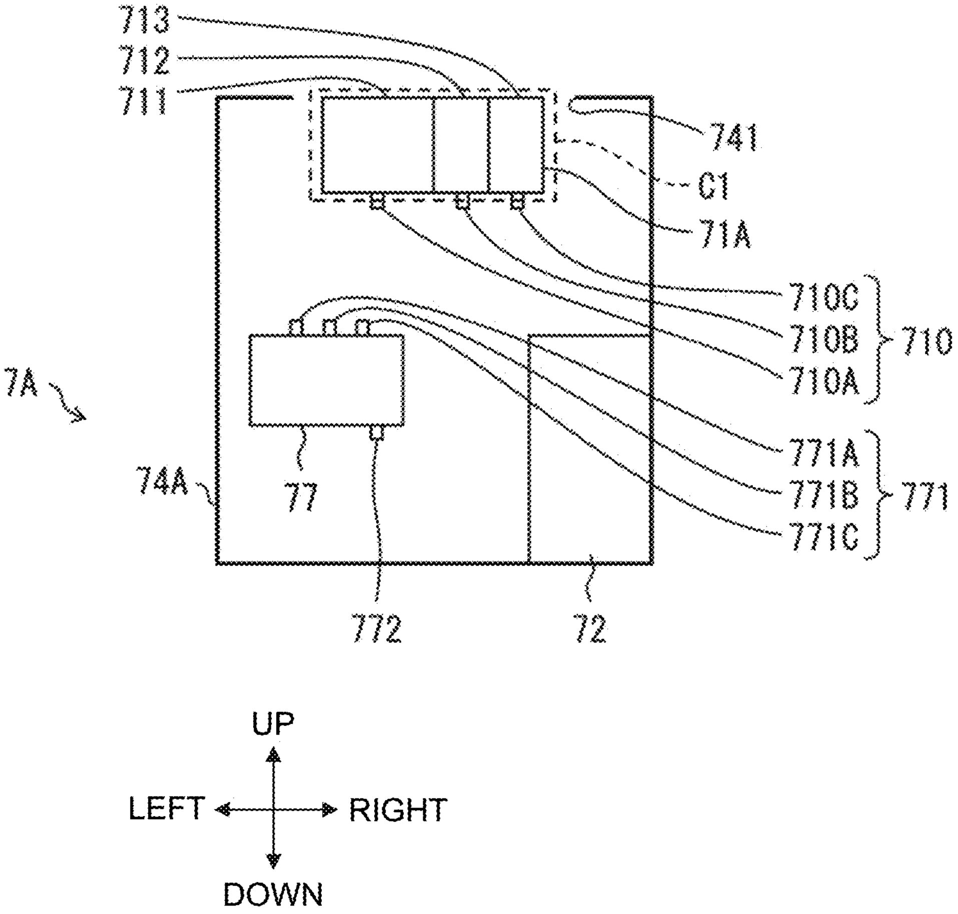
FIG. 7 is a schematic view depicting the configuration in which a waste liquid tube is omitted from a maintenance unit depicted in FIG. 6.

Another embodiment of the present disclosure will be explained in the following, with reference to FIGS. 6 and 7. Note that for the sake of convenience of explanation, same reference numerals are affixed to components, of the second embodiment, which have the same functions as those of the components explained in the first embodiment, and the explanation therefor will not be repeated. FIG. 6 is a schematic view depicting configuration of main parts of an ink-jet printer 1A. FIG. 7 is a schematic view depicting a configuration in which waste liquid tubes 731 and 732 are omitted from a maintenance unit 7A depicted in FIG. 6. The configuration of the ink-jet printer 1A of the second embodiment is different from the configuration of the ink-jet printer 1 of the first embodiment in that a cap 71A is replaced.

As depicted in FIG. 6, the maintenance unit 7A has the cap 71A, a suction pump 72, first waste liquid tubes 731, a second waste liquid tube 732, a unit casing 74A and a switching mechanism 77. The unit casing 74A may be fixed with respect to the main body casing 11, or the unit casing 74 may be provided to be insertable and drawable with respect to the main body casing 11.

The cap 71A has a first cap 711, a second cap 712 and an exhaust cap 713. The first cap 711 is a cap configured to cover a part, of a nozzle surface 421, in which nozzles 42 discharging color inks different from the black ink (yellow, cyan and magenta inks) are formed. The second cap 712 is a cap configured to cover a part, of a nozzle surface 421, in which nozzles 42 discharging the black ink are formed. The exhaust cap 713 is a cap configured to cover an exhaust port (not depicted in the drawings), of the buffer tank 47, via which the air is exhausted from an ink channel inside the buffer tank 47. As depicted in FIG. 7, the cap 71A has projected parts 710A to 710C to which the first waste liquid tubes 731 are connected. The projected parts 710A to 710C are each an example of a “first joint”. The projected parts 710A to 710C each have a configuration same as that of the projected part 811 as explained in the first embodiment. Note that in the following explanation, the nozzles 42 which are included in the plurality of nozzles 42 and which discharge the color inks different from the black ink are referred to as “first nozzles 42A”, and the nozzles 42 which are included in the plurality of nozzles 42 and which discharge the black ink are referred to as “second nozzles 42B”.

As depicted in FIG. 6, the cap 71A is provided to be insertable and drawable with respect to the main body casing 11. The cap 71A is inserted and drawn via an opening 112 formed in an upper wall 11B of the main body casing 11. In the second embodiment, an inserting-drawing direction D2 of the cap 71A is the up-down direction with respect to the main body casing 11.

The switching mechanism 77 is a mechanism configured to perform switching, with respect to the first nozzles 42A and the second nozzles 42B, between a suction state in which the ink is sucked by the suction pump 72 and a non-suction state in which the ink is not sucked by the suction pump 72. The switching mechanism 77 is controlled by the controller 100 so that the switching mechanism 77 sucks the ink(s) selectively from the first nozzles 42A and/or from the second nozzles 42B. Further, the switching mechanism 77 is also a mechanism configured to perform switching, with respect to the exhaust port of the buffer tank 47, between a suction state in which the air is sucked by the suction pump 72 and a non-suction state in which the air is not sucked by the suction pump 72. The switching mechanism 77 is controlled by the controller 100 so as to suck the air from the exhaust port of the buffer tank 47, as necessary. As depicted in FIG. 7, the switching mechanism 77 has projected parts 771 to which the first waste liquid tubes 731 are connected and a projected part 772 to which the second waste liquid tube 732 is connected. The projected parts 771 are each an example of a "second joint". Further, the projected part 772 is an example of a connecting part to which the second waste liquid tube 732 is connected. Each of the projected parts 771 and the projected part 772 has a configuration similar to that of the projected part 811 as explained in the first embodiment.

As depicted in FIG. 6, the first waste liquid tubes 731 are tubes each having one end connected to one of the projected parts 710 of the cap 71A, and the other end connected to one of the projected parts 771 of the switching mechanism 77. In the second embodiment, the first waste liquid tubes 731 are a plurality of first waste liquid tubes 731A to 731C. The first waste liquid tube 731A is connected to a projected part 710A possessed by the first cap 711 of the cap 71A. The first waste liquid tube 731B is connected to a projected part 710B possessed by the second cap 712 of the cap 71A. The first waste liquid tube 731C is connected to a projected part 710C possessed by the exhaust cap 713 of the cap 71A.

Each of the first waste liquid tubes 731 has a length capable of being connected to the cap 71A in a state that the cap 71A is moved from an installed-position C1 at which the cap 71A is installed in the inside of the main body casing 11 to a drawn-out-position C2 at which the cap 71A is drawn out to the outside of the main body casing 11. More specifically, the length of each of the first waste liquid tubes 731 is longer than a length L2 in the inserting-drawing direction D2 from the projected parts 771 to an outer wall surface of the upper wall 11B of the main body casing 11. In other words, in a case that the length of each of the first waste liquid tubes 731 is longer than the length L2, it is possible to move the cap 71A from the installed-position C1 to the drawn-out-position C2. Note that in FIG. 6, the first waste liquid tubes 731 in a case that the cap 71A is positioned at the installed-position C1 is indicated by a solid line, whereas the first waste liquid tubes 731 in a case that the cap 71A is positioned at the drawn-out-position C2 is indicated by a broken line.

The second waste liquid tube 732 is a tube of which one end is connected to the projected part 772 of the switching mechanism 77, and of which other end is connected to the projected part 811 of the first waste liquid tank 81. The second waste liquid tube 732 extends via the suction pump 72. In FIG. 7, a portion, of the second waste liquid tube 72, between the suction pump 72 and the first waste liquid tank 81 is not depicted.

<Flow of Replacement of Cap>

The user draws the cap 71A, which is positioned at the installed-position C1, up to the drawn-out-position C2. Afterwards, the user releases the connection between the projected parts 710 of the cap 71A and the first waste liquid tubes 731. Then, the user replaces the cap 71A with a new cap 71A. Note that in the second embodiment, it is acceptable to provide a configuration wherein the connection of the first waste liquid tube 731 is released on the side of the suction pump 72 at the time of replacing the cap 71A. Namely, it is acceptable to release the connection between the projected parts 771 of the switching mechanism 77 and the first waste liquid tubes 731.

According to the above-described configuration, it is possible to draw the cap 71A to the outside of the main body casing 11, while maintaining a connection between the cap 71A and the suction pump 72 by the first waste liquid tube 731. Accordingly, it is possible to release the connection of the first waste liquid tube 731 at the outside of the main body casing 11. By doing so, the user can easily replace the cap 71A. Further, according to the above-described configuration, since the length of each of the first waste liquid tubes 731 is longer than the length L2, it is possible to move the cap 71A up to the drawn-out-position. By doing so, the user can easily replace the cap 71A.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the first embodiment, the inserting-drawing direction D1 is not limited to the left-right direction. The inserting-drawing direction D1 may be any direction other than the left-right direction. In the second embodiment, the inserting-drawing direction D2 is not limited to the up-down direction. The inserting-drawing direction D2 may be any direction other than the up-down direction. In the second embodiment, the cap 71A may include one or more of the first cap 711, the second cap 712, and the exhaust cap 713. The waste liquid tube(s) 731 may include one or more of the first waste liquid tubes 731A to 731C. The switching mechanism 77 may be omitted.

Additional Notes

In the present disclosure, the inserting-drawing direction is defined as a linear direction from the installed-position toward the drawn-out-position. A moving direction for changing the posture of the maintenance unit or the cap at an intermediate position from the installed-position toward the drawn-out-position, or at an intermediate position from the drawn-out-position toward the installed-position is not included in the inserting and drawing direction. To provide an example, in a case that the maintenance unit can be positioned at the installed-position or the drawn-out-position by rotating the maintenance unit at an intermediate position in the movement of the maintenance unit in the inserting-drawing direction, the rotating direction of the maintenance unit which corresponds to the change in the posture is not included in the inserting-drawing direction of the present disclosure.

The present disclosure is not limited to each of the embodiments described above, and various changes can be made within the scope of the claims; an embodiment which is obtained by appropriately combining the technical means disclosed in the respective, different embodiments is also included in the technical scope of the present disclosure.

What is claimed is:

1. A liquid discharging apparatus comprising:

a main body casing;

a head having a nozzle configured to discharge a liquid;

a maintenance unit including a cap configured to seal the nozzle by covering a nozzle surface of the head, a suction pump configured to suck the liquid in the nozzle and a waste liquid tube in which the liquid sucked by the suction pump is to flow; and a waste liquid reservoir which has a joint to which the waste liquid tube is connected or to be connected, and which is configured to store the liquid sent from the maintenance unit, wherein the maintenance unit is configured to be inserted into and drawn from the main body casing; and the waste liquid tube has a length to connect the waste liquid reservoir and the maintenance unit in a state that the maintenance unit has been moved from an installed-position at which the maintenance unit is installed in an inside of the main body casing to a drawn-out-position at which the maintenance unit is drawn out to an outside of the main body casing.

2. The liquid discharging apparatus according to claim 1, wherein the maintenance unit includes a unit casing in which the cap and the suction pump are housed; and a length of a portion of the waste liquid tube drawn out to an outside of the unit casing is longer than a length from the joint to an outer wall surface of the main body casing in an inserting-drawing direction of the maintenance unit along which the maintenance unit is inserted into and drawn from the main body casing.

3. The liquid discharging apparatus according to claim 2, wherein the waste liquid tube has a free-moving-portion configured to move, at the outside of the unit casing, in a direction which is a radial direction of the waste liquid tube and which is a direction separating from the unit casing; and a length of the free-moving-portion is longer than the length from the joint to the outer wall surface of the main body casing in the inserting-drawing direction of the maintenance unit.

4. The liquid discharging apparatus according to claim 3, wherein the unit casing has a fixer configured to fix the portion of the waste liquid tube drawn out to the outside of the unit casing so that the portion of the waste liquid tube drawn out to the outside of the unit casing is not separated from the unit casing; and the free-moving-portion is an area from a part, of the waste liquid tube, fixed to the unit casing by the fixer and an end, of the waste liquid tube, on a side of the joint.

5. The liquid discharging apparatus according to claim 4, wherein the fixer is positioned, in the inserting-drawing direction and in a state that the maintenance unit is positioned at the installed position, at a position different from a position of the joint.

6. The liquid discharging apparatus according to claim 5, wherein the joint is positioned, in the inserting-drawing direction and in the state that the maintenance unit is positioned at the installed position, between the outer wall surface of the main body casing and the fixer.

7. The liquid discharging apparatus according to claim 3, wherein the unit casing has a holder configured to hold the free-moving-portion of the waste liquid tube in a case that the maintenance unit is positioned at the installed position.

8. The liquid discharging apparatus according to claim 2, wherein the waste liquid tube is drawn out from a surface, of the unit casing, facing a direction in which the maintenance unit is inserted into the main body casing, along the inserting-drawing direction.

9. The liquid discharging apparatus according to claim 2, wherein the joint is provided on a surface, of the waste liquid reservoir, facing the unit casing of the maintenance unit positioned at the installed-position.

10. The liquid discharging apparatus according to claim 1, wherein the joint is positioned, in an inserting-drawing direction of the maintenance unit, between an outer wall surface of the main body casing and at least a part of the waste liquid reservoir.

11. The liquid discharging apparatus according to claim 1, wherein the waste liquid reservoir includes a first waste liquid reservoir fixed to the main body casing, and a second waste liquid reservoir which is configured to store a waste liquid from the first waste liquid reservoir and which is configured to be inserted into and drawn from the main body casing; and the first waste liquid reservoir has the joint.

12. A liquid discharging apparatus comprising:

a main body casing;

a head having a nozzle configured to discharge a liquid;

a maintenance unit including a cap configured to seal the nozzle by covering a nozzle surface of the head, a suction pump configured to suck the liquid in the nozzle and a waste liquid tube which is connected or to be connected to a first joint of the cap and in which the liquid sucked by the suction pump is to flow; and a waste liquid reservoir to which the waste liquid tube is connected and which is configured to store the liquid sent from the maintenance unit, wherein the cap of the maintenance unit is configured to be inserted into and drawn from the main body casing; and the waste liquid tube has a length to connect the waste liquid reservoir and the cap in a state that the cap has been moved from an installed-position at which the cap is installed in an inside of the main body casing to a drawn-out-position at which the cap is drawn out to an outside of the main body casing.

13. The liquid discharging apparatus according to claim 12, wherein the nozzle includes a first nozzle and a second nozzle;

the cap includes a first cap configured to cover a first part of the nozzle surface of the head in which the first nozzle is formed, and a second cap configured to cover a second part of the nozzle surface of the head in which the second nozzle is formed;

the maintenance unit further includes a switch configure to perform switching, with respect to the first nozzle and the second nozzle, between a suction state in which the liquid is sucked by the suction pump and a non-suction state in which the liquid is not sucked by the suction pump;

the waste liquid tube includes a first waste liquid tube having a first end connected or to be connected to the first joint and a second end connected or to be connected to a second joint of the switch, and a second waste liquid tube having a first end connected to the switch and a second end connected to a side of the waste liquid reservoir via the suction pump; and a length of the first waste liquid tube is longer than a length from the second joint of the switch to an outer wall surface of the main body casing in an inserting-drawing direction of the cap along which the cap of the maintenance unit is inserted into and drawn from the main body casing.

* * * * *